May 12, 1959

C. L. GUILLAUD 2,886,529

MAGNETIC MATERIALS AND THEIR METHODS OF MANUFACTURE

Filed July 23, 1953

| A | B | C | D | E | F | G | H | I | J | K | L |
|---|---|---|---|---|---|---|---|---|---|---|---|
| MnO % | Fe$_2$O$_3$ % | | $\mu$ | H | $\frac{H \cdot 10^6}{\mu^2}$ | Fn | $\frac{Fn \cdot 10^3}{\mu}$ | FeO% | Bmax | $\theta°$C | $\alpha \cdot 10^3$ |
| 27 | 50,6 | 4 h. à 1250° N$_2$ + 0,2% O$_2$ | 3050 | 8840 | 950 | 0,65 | 0,21 | 0,70 | 3985 | 140 | 5,4 |
|  | 51,6 |  | 3230 | 5320 | 510 | 0,87 | 0,27 | 1,45 | 4250 | 157 | 2,2 |
|  | 52,6 |  | 3650 | 2660 | 200 | 0,94 | 0,26 | 2,25 | 4540 | 177 | 1,3 |
|  | 53,6 |  | 2840 | 4030 | 500 | 0,54 | 0,19 | 2,90 | 4750 | 194 | 1,1 |
|  | 54,6 |  | 2240 | 4515 | 900 | 0,38 | 0,17 | 3,70 | 5000 | 210 | 1,0 |
|  | 55,6 |  | 1735 | 4215 | 1400 | 0,64 | 0,37 | 4,40 | 5180 | 229 | 0,8 |
| 29 | 50,6 |  | 2125 | 6954 | 1540 | 0,55 | 0,25 | 0,75 | 4295 | 161 | 10,2 |
|  | 51,6 |  | 2400 | 3859 | 670 | 0,58 | 0,24 | 1,50 | 4590 | 178 | 5,0 |
|  | 52,6 |  | 2910 | 2794 | 330 | 0,67 | 0,23 | 2,30 | 4835 | 195 | 1,8 |
|  | 53,6 |  | 2460 | 4538 | 750 | 0,59 | 0,24 | 2,90 | 5065 | 213 | -0,1 |
|  | 54,6 |  | 1800 | 4018 | 1240 | 0,43 | 0,24 | 3,65 | 5230 | 230 | -0,3 |
|  | 55,6 |  | 1400 | 3370 | 1730 | 0,43 | 0,31 | 4,50 | 5365 | 250 | -0,5 |
| 31 | 50,6 |  | 2140 | 8610 | 1880 | 0,34 | 0,16 | 0,65 | 4595 | 174 | 10,0 |
|  | 51,6 |  | 2320 | 5275 | 980 | 0,42 | 0,18 | 1,40 | 4765 | 185 | 9,0 |
|  | 52,6 |  | 3054 | 2520 | 270 | 0,58 | 0,19 | 2,25 | 4980 | 198 | 4,5 |
|  | 53,6 |  | 2710 | 2200 | 300 | 0,35 | 0,13 | 2,94 | 5130 | 213 | 0,2 |
|  | 54,6 |  | 2150 | 2950 | 650 | 0,25 | 0,12 | 3,63 | 5265 | 230 | -0,7 |
|  | 55,6 |  | 1710 | 3305 | 1130 | 0,22 | 0,13 | 4,30 | 5385 | 250 | -1,0 |
| 33 | 51,6 |  | 1750 | 4073 | 1330 | 0,40 | 0,23 | 1,40 | 4855 | 207 | 9,8 |
|  | 52,6 |  | 2090 | 3670 | 840 | 0,50 | 0,24 | 2,30 | 5075 | 221 | 7,5 |
|  | 53,6 |  | 2826 | 2555 | 320 | 0,70 | 0,25 | 2,95 | 5150 | 236 | 4,6 |
|  | 54,6 |  | 2390 | 3656 | 640 | 0,67 | 0,28 | 3,70 | 5305 | 250 | -2,0 |
|  | 55,6 |  | 1680 | 3838 | 1360 | 0,86 | 0,51 | 4,45 | 5470 | 265 | -2,5 |
| 35 | 50,6 |  | 1340 | 7360 | 4100 | 0,15 | 0,11 | 0,75 | 4745 | 199 | 10,3 |
|  | 51,6 |  | 1560 | 4415 | 1815 | 0,19 | 0,12 | 1,50 | 5010 | 217 | 9,3 |
|  | 52,6 |  | 2095 | 2805 | 640 | 0,29 | 0,14 | 2,28 | 5165 | 229 | 7,3 |
|  | 53,6 |  | 2490 | 2355 | 380 | 0,25 | 0,10 | 2,94 | 5285 | 244 | 3,6 |
|  | 54,6 |  | 2200 | 1890 | 390 | 0,26 | 0,12 | 3,73 | 5420 | 253 | -2,2 |
|  | 55,6 |  | 1520 | 1850 | 800 | 0,21 | 0,14 | 4,10 | 5475 | 269 | -3,4 |
| 38 | 50,6 |  | 1500 | 5446 | 2420 | 0,24 | 0,16 | 0,70 | 4915 | 220 | 12,0 |
|  | 51,6 |  | 1620 | 4015 | 1530 | 0,27 | 0,17 | 1,60 | 5085 | 230 | 11,2 |
|  | 52,6 |  | 1840 | 3150 | 930 | 0,17 | 0,16 | 2,25 | 5240 | 245 | 10,5 |
|  | 53,6 |  | 2340 | 2985 | 545 | 0,40 | 0,17 | 2,92 | 5360 | 255 | 9,2 |
|  | 54,6 |  | 2080 | 1840 | 425 | 0,37 | 0,18 | 3,67 | 5450 | 275 | -0,1 |
|  | 55,6 |  | 1610 | 2720 | 1050 | 0,48 | 0,30 | 4,20 | 5500 | 285 | -2,8 |

United States Patent Office 2,886,529
Patented May 12, 1959

2,886,529

MAGNETIC MATERIALS AND THEIR METHODS OF MANUFACTURE

Charles Louis Guillaud, Bellevue, France, assignor to Centre National de la Recherche Scientifique, Paris, France, a French society Application July 23, 1953, Serial No. 369,823

Claims priority, application France July 31, 1952

14 Claims. (Cl. 252—62.5)

The present invention relates to new magnetic materials having a high permeability and low losses, particularly adapted for use at high frequencies, such for instance as used in the art of telecommunication. My invention also relates to the methods of preparing these materials.

The materials according to the present invention are mixed iron, manganese and zinc oxides forming solid solutions, prepared from fine powders of oxides of these metals, said powders, after mechanical preparation of a homogeneous mixture, being compressed into cores of the desired geometrical shape which are subsequently subjected to a suitable thermal treatment. These materials crystallize in the cubic system and belong to the group of "spinels." They are usually called "ferrites."

The ferrites according to the present invention have remarkable properties, in particular a high initial permeability and low magnetic losses. They constitute an important improvement over the ferrites known at the present time.

Furthermore, one of the chief obstacles relating to the use of ferrites was avoided by making it possible systematically to obtain new ferrites having a coefficient of relative variation of the initial permeability with respect to the temperature, of a desired value and in particular very close to zero.

It is by complying with conditions which concern the composition of the ferrite, the methods of obtaining it, the nature of the oxides and their purity that it is possible systematically to obtain the desired improved properties.

The ferrites according to the present invention are characterized by a composition given by the following formula:

$$(m\text{Fe}_2\text{O}_3, x\text{MnO}, y\text{FeO}, q\text{ZnO})$$

in which $m$, $x$, $y$, $q$ represent the molecular percentages of the components ($m+x+y+q=100\%$).

According to the present invention, these molecular percentages must range within the following limits:

$49.7\% < m < 50.6\%$ and preferably $49.7\% < m < 50.3\%$
$24\% < x < 38\%$
$0.3\% < y < 7.5\%$ Within these limits, all kinds of combinations may be used; it follows that $q=[100-(m+x+y)]\%$.

As already mentioned, the mixture of oxides which is to be compressed into cores of the desired size and shape must first be reduced into a fine powder. This is usually done in a mill or grinding machine.

I will first describe the components of the mixture to be placed in the mill or grinding machine. This mixture contains iron sesquioxide $\text{Fe}_2\text{O}_3$, manganese oxide, preferably the saline oxide $\text{Mn}_3\text{O}_4$, and zinc oxide ZnO. Conventionally, the percentage of the manganese oxide will be indicated in terms of MnO, even in the case of the saline oxide $\text{Mn}_3\text{O}_4$; in other words, this percentage will be referred to the number of manganese atoms. As a matter of fact, by indicating a molecular proportion of MnO, I accordingly indicate a molecular percentage of $\text{Mn}_3\text{O}_4$, and besides of any other manganese oxide.

In the final product which is formed, and which is called "ferrite," there is another component, to wit FeO, and furthermore, manganese is then in the form MnO whatever be the initial manganese oxides in the mixture. This notion will be referred to with more details in what follows. Due to the formation of FeO, the molecular percentages in MnO and ZnO are no longer the same as in the mixture of oxides before compression; they are slightly reduced, but the ratios

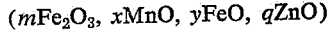

$$\frac{\text{Fe}}{\text{Mn}} \text{ and } \frac{\text{Mn}}{\text{Zn}}$$

have remained constant. A relatively simple calculation, for instance starting from the molecular proportions of the components of said mixture of oxides and also from the proportion by weight of FeO that is formed, makes it possible to determine the molecular proportions of the components of the ferrite, that is to say $m$, $x$, $y$, $q$.

A suitable calculation, taking into account the already stated molecular proportions of the components of the ferrite that is formed, shows that the molecular proportions in $\text{Fe}_2\text{O}_3$ and MnO of the mixture of oxides before thermal treatment must range respectively from 50 to 56% and from 24.3 to 39%.

Further, it has been found that ferrites having the best possible magnetic properties according to the present invention can only be obtained subject to the condition that the oxide mixture from which they are prepared contain less than 0.05% in weight of impurities and less than 0.01% in weight of any impurity of the group of substances comprising barium, strontium and lead.

The hereinafter described methods of manufacture make it possible to vary the properties of the ferrites that are obtained. These properties depend upon various parameters, in particular the proportion of manganese oxide in the ferrite that is considered.

By way of example, I will hereinafter consider six groups of ferrites such that, in each of them, the molecular percentage in MnO before compression has a constant value. Thus I will study groups containing 27%, 29%, 31%, 33%, 35%, 38% of MnO. Inside each of these groups, the ferrites may be differentiated by the molecular proportion in $\text{Fe}_2\text{O}_3$ which characterizes the mixture of oxides before compression, which proportion may be respectively for instance: 50.6%, 51.6%, 52.6%, 53.6%, 54.6%, 55.6%.

In order to give an example for the lower limit in MnO which is being claimed, I have also added the group of ferrites obtained from a mixture of oxides the molecular percentages of which before compressing are 24.4% for MnO and respectively 50.6%, 51.6%, 52.6%, 53.6%, 54.6%, 55.6% for $\text{Fe}_2\text{O}_3$.

The properties of the ferrites of a given group may be described as a function of the following main parameters: molecular percentage in $Fe_2O_3$ before grinding or before compressing, or again percentage by weight of FeO in the ferrite that is finally formed (an amount which may be given directly by chemical analysis). As a matter of fact, these parameters are not independent, because, as in all the ferrites that are finally formed (this no longer relates to the initial mixture of oxides) according to the invention, the proportion of $Fe_2O_3$ is very substantially equal to 50%; the supplementary amount of iron is found in the form of divalent iron FeO. I will use either of these parameters indifferently in the course of the following description.

The proportion of divalent iron in the product finally obtained may be determined by the concentration in reducing salt of a solution obtained by hydrochloric attack of a sample protected against the action of air (in an inert atmosphere).

In order to define, according to this method, a percentage of FeO, it is necessary to suppose that all the manganese of the ferrite is in the divalent state. This hypothesis seems to be the most probable.

Even if this hypothesis were not correct and if there were actually manganese ions which were not in the divalent state, what follows would remain true provided that the result of the above mentioned chemical test would be conventionally called "FeO." The conclusions relating to the manufacture of the ferrites would remain unchanged.

According to the thermal treatments and to the atmosphere that is used, I may vary within large limits the amount of FeO and, consequently, the percentage of $Fe_2O_3$ of the ferrite that is finally formed. It was found, according to the invention, that, for ferrites having been prepared from the same initial mixture of oxides, their initial magnetic permeability is the higher as the molecular percentage in $Fe_2O_3$ is closer to 50%.

Therefore, according to the present invention, it is the amount of FeO which partly determines the magnetic properties of the ferrites. Its importance, as it will be shown hereinafter, is very great and the conditions of preparation must be adapted in order to obtain it in the desired proportion.

The invention will now be described in a detailed fashion with reference to the annexed drawings in which:

Fig. 1 is a table indicating the various properties of ferrites in accordance with the compositions thereof.

in which H is the hysteretic loss coefficient, and of the quantity $$\frac{Fn}{\mu} \cdot 10^3$$

in which Fn is the eddy current losses coefficient, as a function of the molecular percentage in $Fe_2O_3$ before compressing of the mixture.

Figure 5:
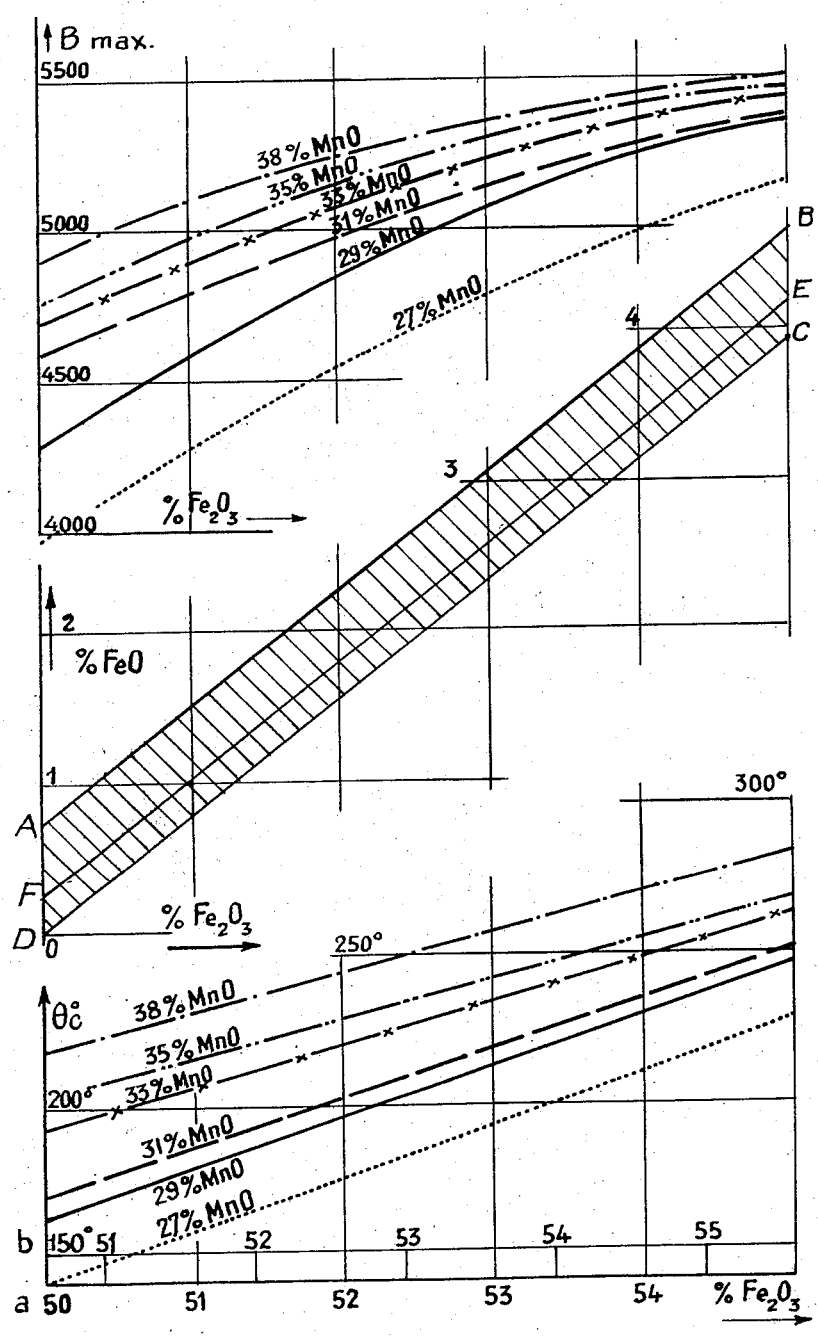

Fig. 5 shows, as a function of the composition of the initial mixture, the values of the maximum admissible magnetic induction and of the Curie temperatures, and also the values of the final percentage in FeO (percentage by weight) of the products according to the invention, which values must range substantially within the limits of the cross hatched portion of the drawing.

Figure 6:
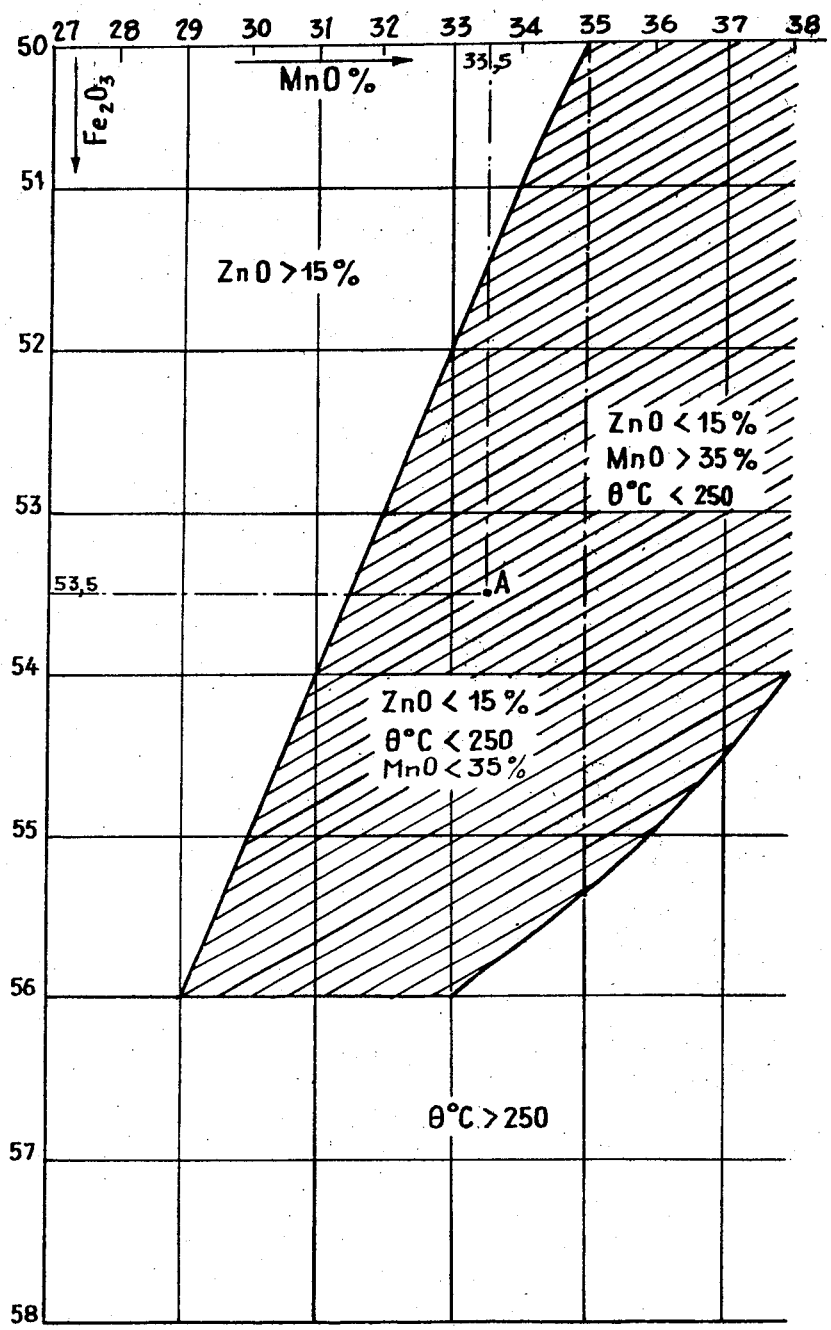

Fig. 6 indicates the limits of the compositions of the ferrites having a Curie point lower than 250° C. and complying with the conditions taken separately or together: ZnO<15%, MnO>35%.

Figure 7:
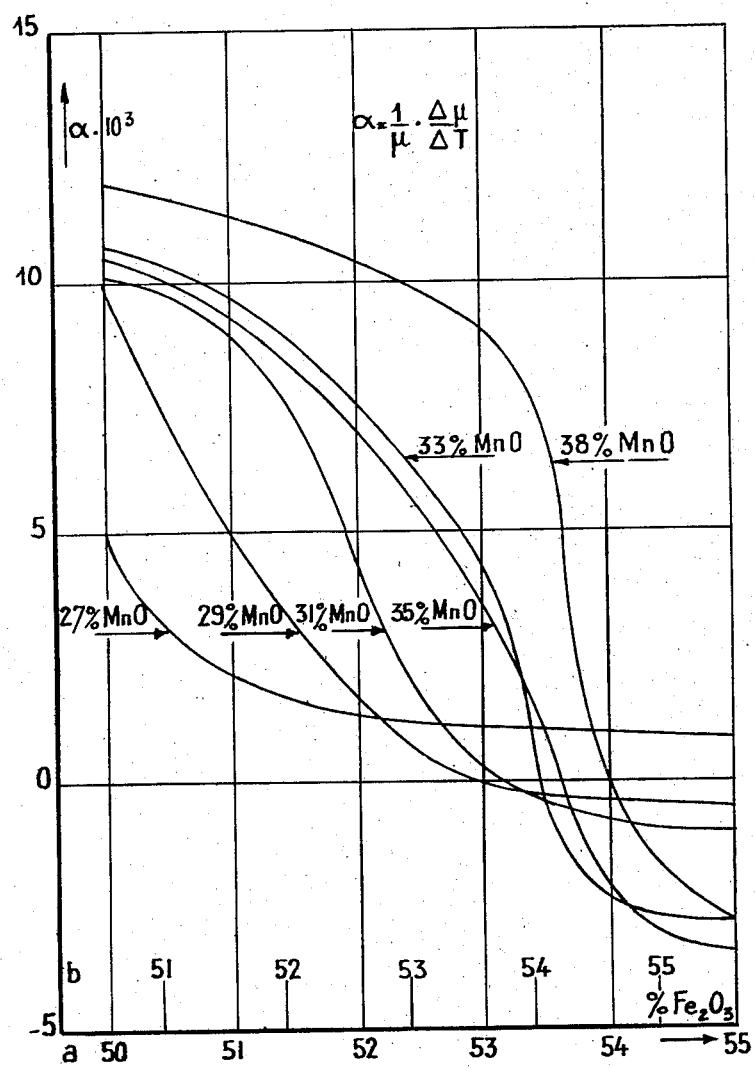

Fig. 7 gives, still as a function of the composition of the initial mixture, the values of the coefficients $\alpha$ of relative variation of the magnetic permeability with the temperature of the same products, indicated in thousandths per centigrade degree.

Figure 8:
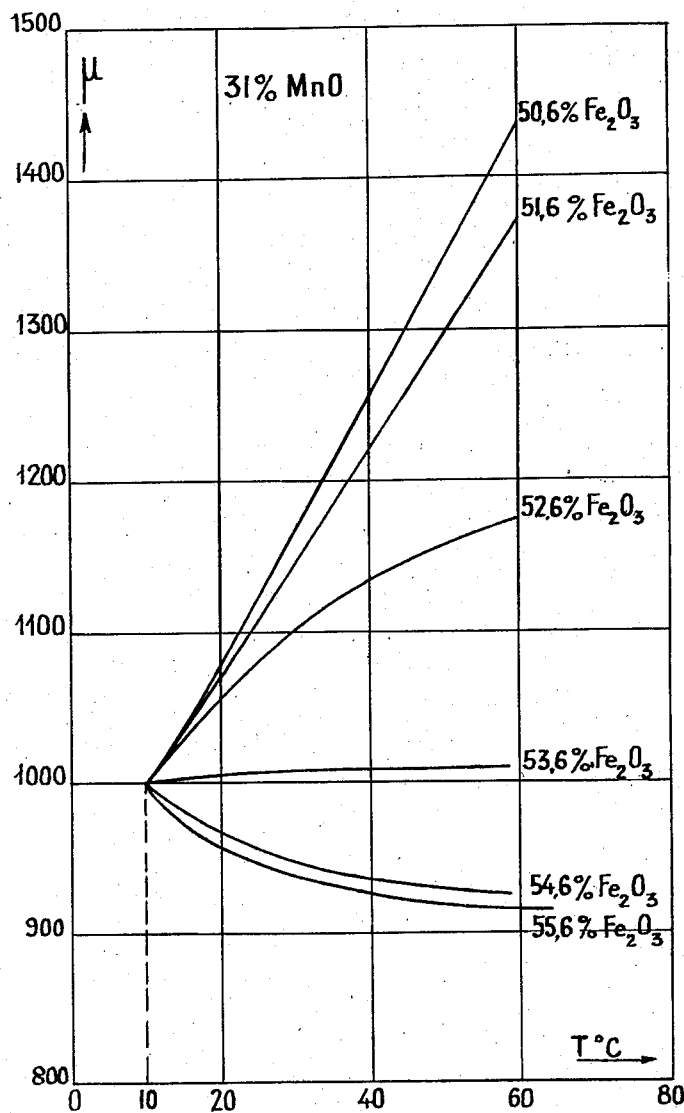

Fig. 8 gives, as a function of the temperature, the relative values of the initial permeability referred to a common value of 1000 at the temperature of 10° C. for various percentages, before compressing, of $Fe_2O_3$, for a group of ferrites having a molecular percentage in MnO, before compressing, equal to 31%.

Figure 9:
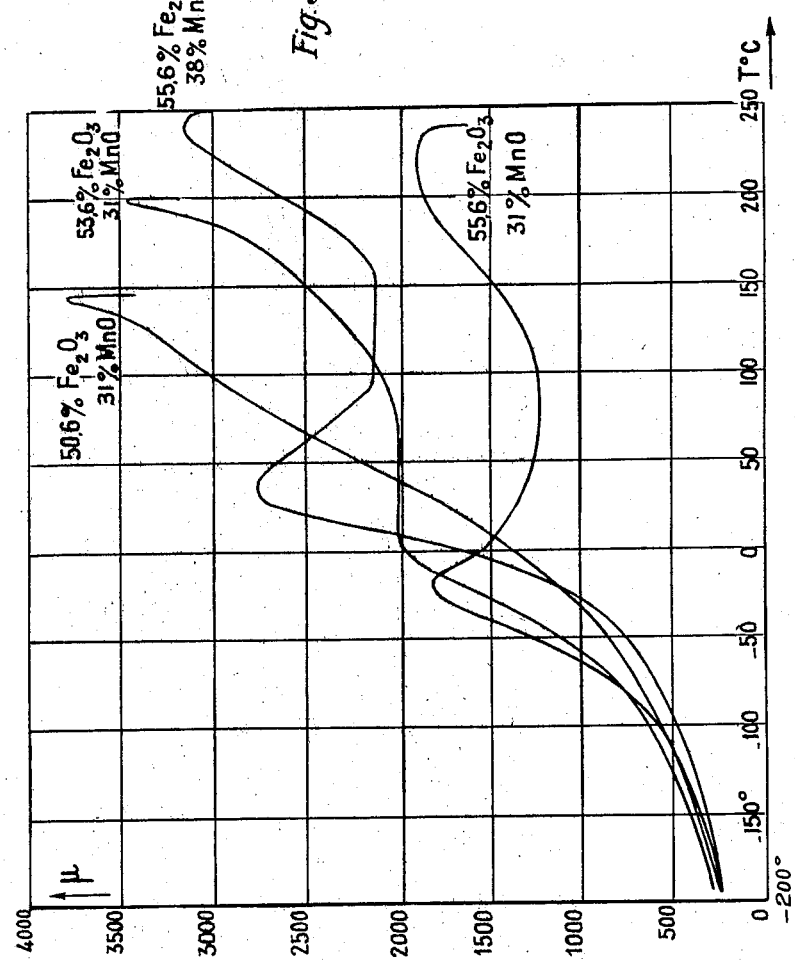

Fig. 9 shows the law of variation, as a function of the temperature, of the initial magnetic permeability for various compositions of products according to the invention.

Figure 10:
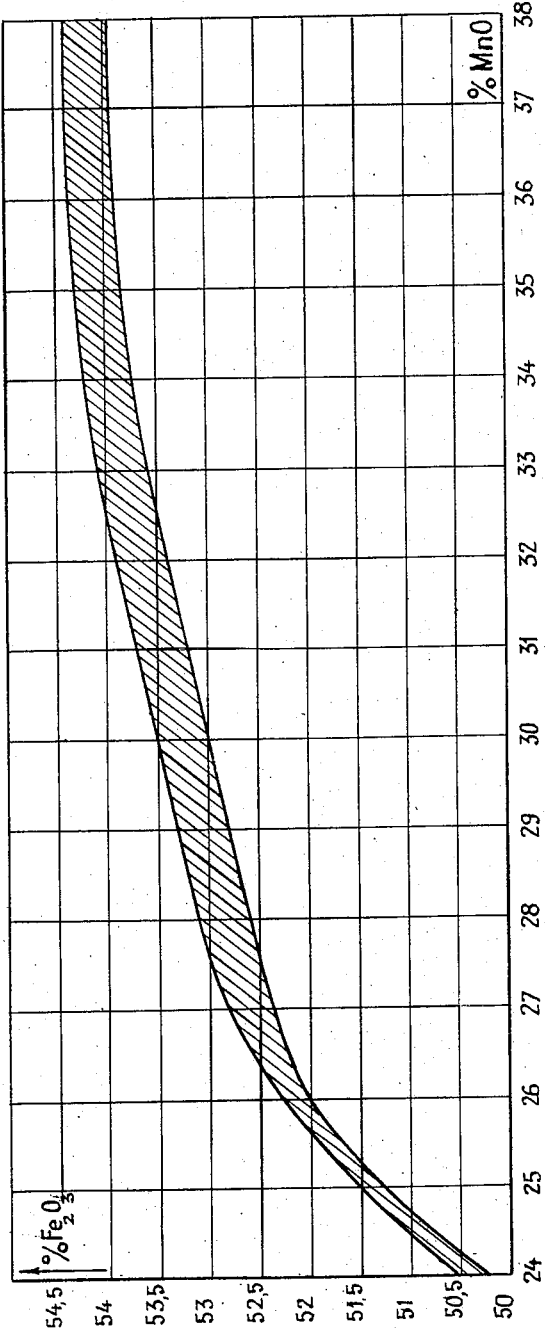

Fig. 10 gives, as a function of the molecular percentages in MnO, before compressing, the molecular percentages in $Fe_2O_3$, before compressing, for the obtainment of the maximum initial permeability.

Figure 11:
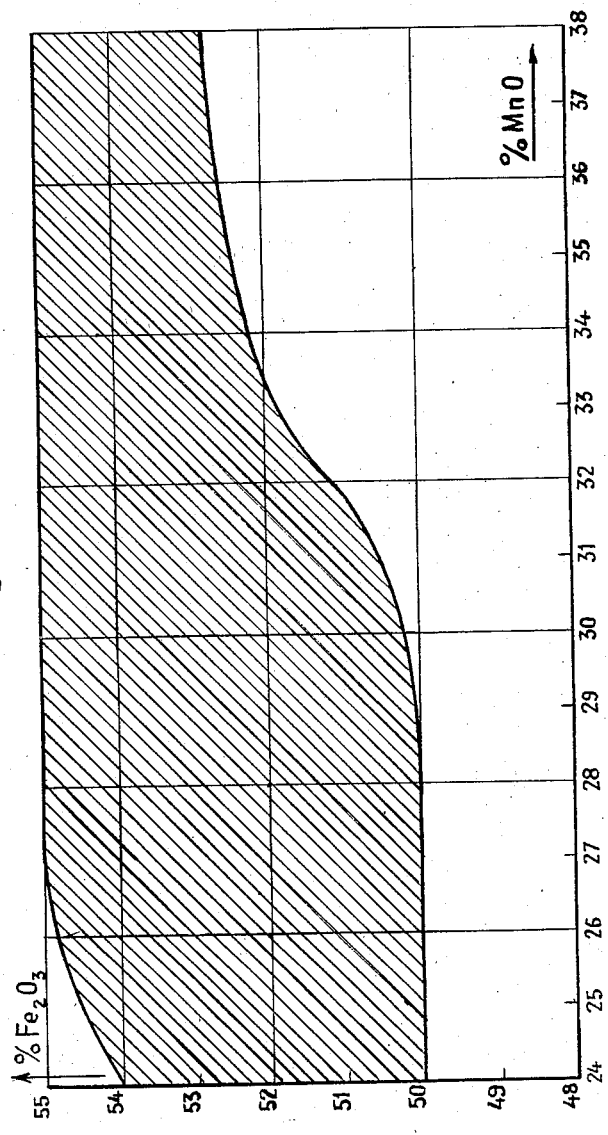

Fig. 11 gives, as a function of the molecular percentages in MnO, before compressing, the molecular percentages, before compressing, in $Fe_2O_3$ for the obtainment of initial permeabilities higher than 2000.

Figure 12:
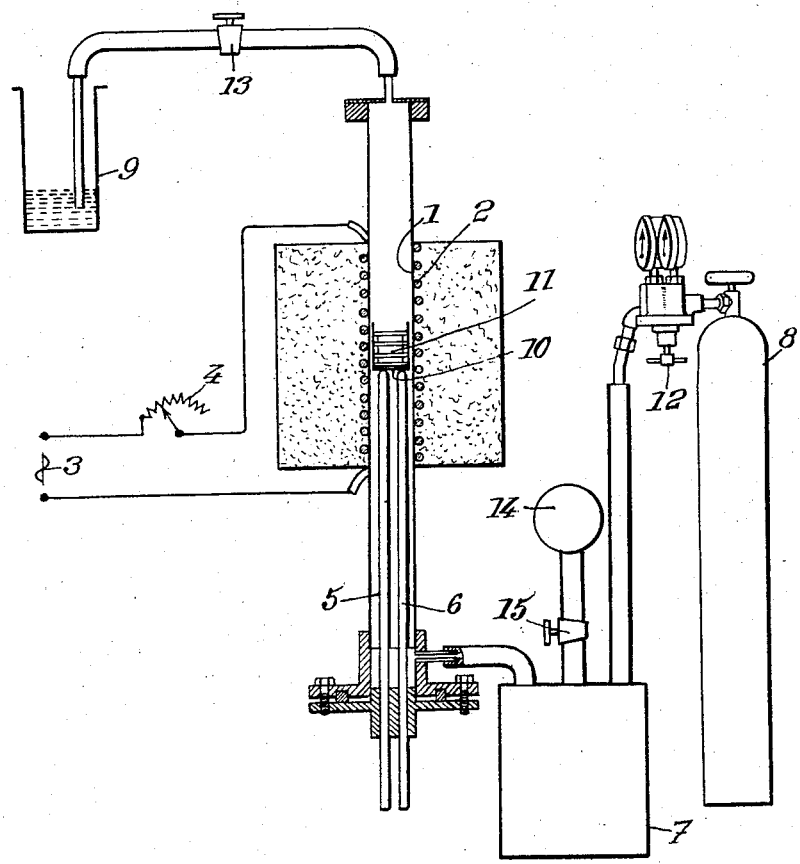

Fig. 12 diagrammatically shows an oven for the thermal treatment of the oxides after compression thereof.

In Figs. 2, 3, 5, 7, I used two scales of abscissas indicated by $a$ and $b$. The second of these scales corresponds to the true percentage of $Fe_2O_3$ present in the products before compression thereof, whereas the first one corresponds to a percentage reduced by 0.6% in order to make allowance for the fact that it was found by weighing that the particular grinding mechanical process that was used for compressing the powders introduced an amount of iron corresponding to an excess of 0.6% of the molecular percentage of $Fe_2O_3$. The amounts of $Fe_2O_3$ to be introduced into the grinding mill are therefore the last mentioned percentages.

Before separately studying each of their properties, I give hereinafter, in the table of Fig. 1, a summary of the experimental results obtained for six groups of ferrites, each group being, as already stated, characterized by the same molecular percentage of MnO before compression (column A). Inside each of these six groups, the table of Fig. 1 shows the properties of the ferrite prepared by starting from oxide mixtures the molecular percentages of which in $Fe_2O_3$, before compression, range from 50.6% to 55.6% (column B). If the grinding process adds 0.6% of $Fe_2O_3$ to the molecular percentage in $Fe_2O_3$ before grinding, the corresponding proportions, before grinding, will be from 50% to 55% and, consequently, the percentages in MnO before grinding will be practically increased by 0.3% with respect to those before compressing. In column C there is indicated the thermal treatment to which the mixture of oxides is subjected after compression.

In the table of Fig. 1, I have designated by $\mu$ (column D) the initial magnetic permeability of the product that is obtained. The initial permeability of every sample was measured in a field lower than 1 millioersted for a frequency of 800 hertz and at a temperature of 20° C. In order to define the losses, I consider the formula:

$$\frac{Rp}{L} = Fn \cdot \frac{f^2}{800^2} + H \cdot \frac{NI}{1} \cdot \frac{f}{800} + t \cdot \frac{f}{800}$$

in which:

Rp is the loss resistance in the ferrite core of an inductance coil, in ohms;

L is the inductance of this coil, in henrys;

$f$ is the frequency in hertz;
$N$ is the number of turns of the winding of the coil;
$I$ is the efficacious value of the current in the winding, in amperes;
$l$ is the length of the mean line of force, in cms.;
$Fn$ is the coefficient of losses by Foucault currents;
$H$ is the coefficient of losses by hysteresis;
$t$ is the coefficient of residual losses.

The Foucault current losses coefficient $Fn$, in ohms per henry, conventionally referred to a frequency of 800 hertz, is measured for frequencies ranging from 40 to 200 kilohertz, in a field sufficiently low to make the hysteresis losses negligible (1 millioersted) and at a temperature of 20° C., for circuits the cross section of which is about $0.5 \times 0.6 = 0.3$ cm.$_2$.

The hysteresis losses coefficient $H$, expressed in ohms per henry, for a field of $$\frac{NI}{l} = 1 A.t/cm.$$

and also conventionally referred to a frequency of 800 hertz, is measured in fields ranging from 2 to 30 millioersteds, at 100 kilohertz and at a temperature of 20° C.

The residual losses coefficient $t$, expressed in ohms per henry and also conventionally referred to a frequency of 800 hertz, is deduced from the ordinate at the origin of curves $$\frac{Rp}{f.L} = g(f)$$

for a field equal to zero and a temperature of 20° C.

In the table of Fig. 1, the values of $H$ (column E) and of $Fn$ (column G) are indicated and also the values $$\frac{H}{\mu^2}\cdot 10^6 \text{ (column F) and } \frac{Fn}{\mu}\cdot 10^3 \text{ (column H)}$$

these ratios have a particular interest for practical purposes and it was found that the application of the above formula is quite justified.

Figure 2:
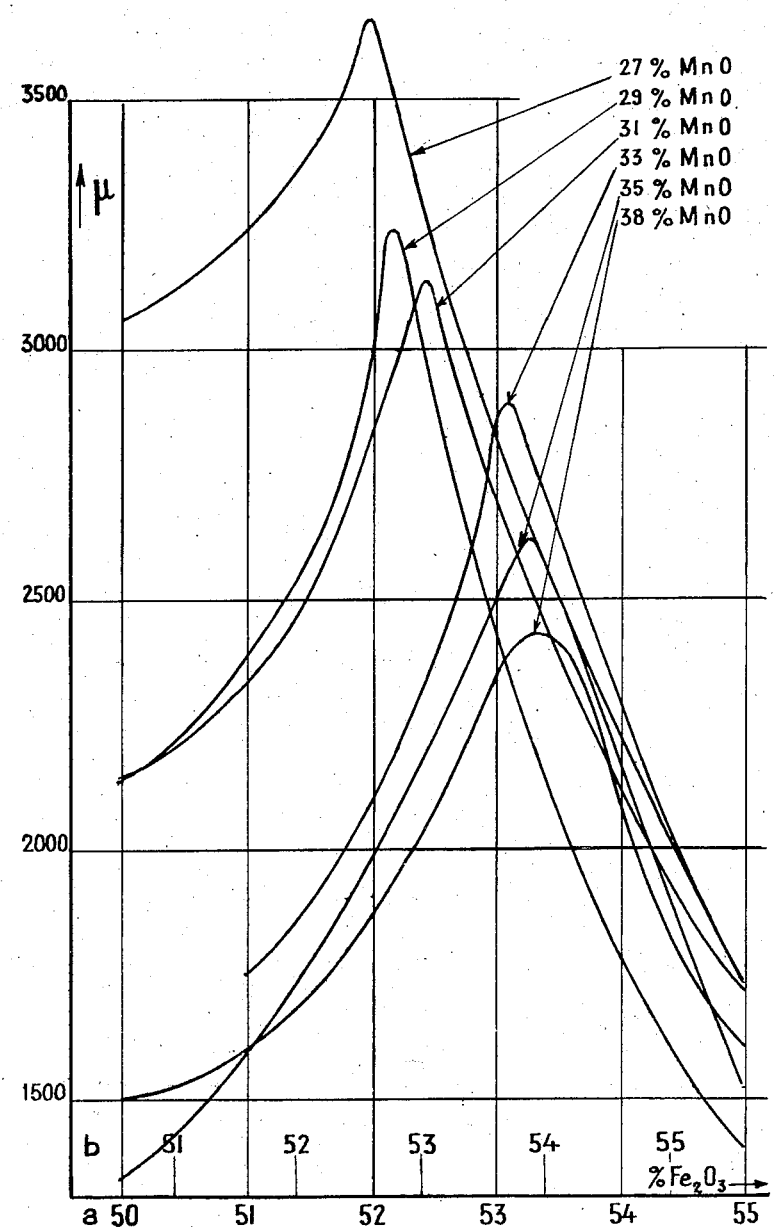
Fig. 2 shows a set of curves indicating, as a function of the molecular percentage of manganese oxide MnO before compression and of the initial percentage of $Fe_2O_3$, the values of the initial magnetic permeability of the final product that is obtained.
Figure 3:
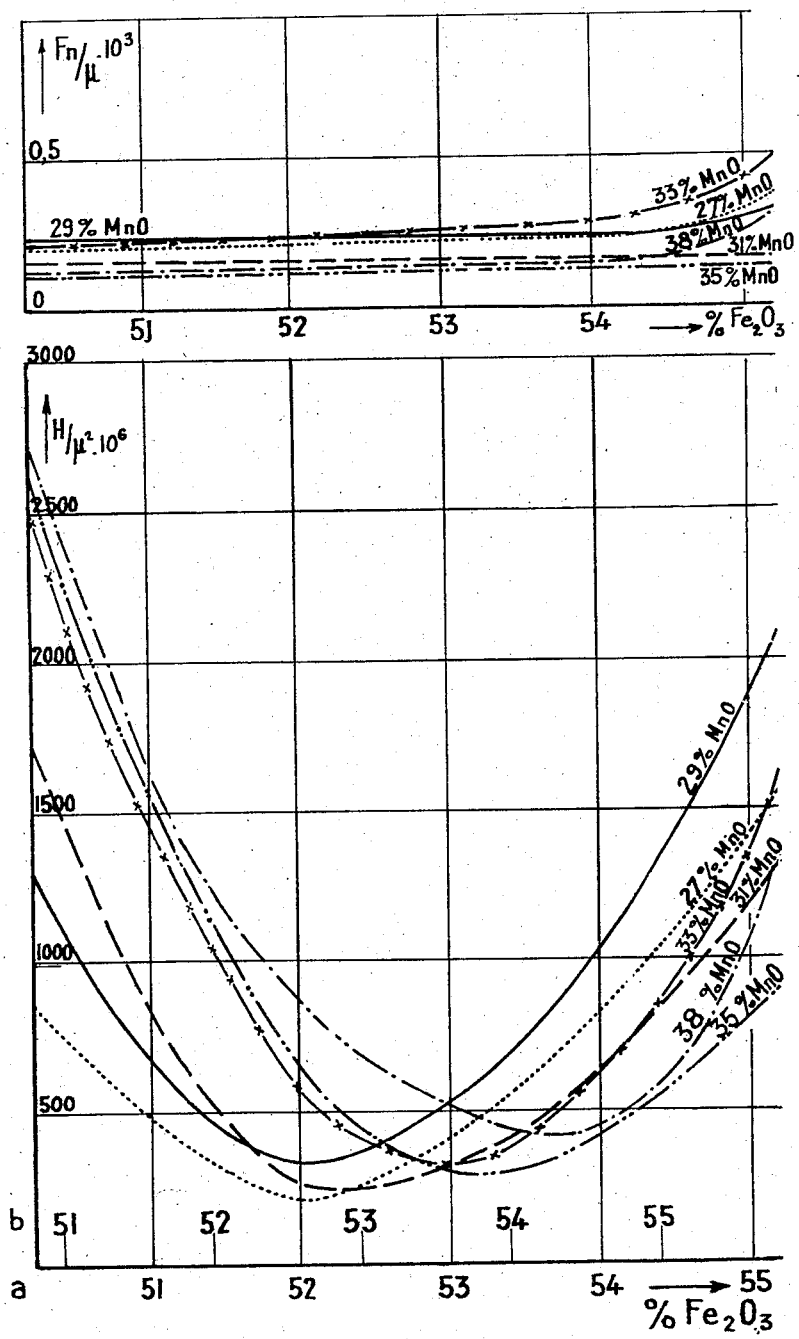
Fig. 3 shows, as a function of the same factors, magnitudes representing the coefficients of loss by Foucault currents and by hysteresis of the same product.

Fig. 3 illustrates these results. It is found, which is particularly important, that the ferrites which have the best hysteresis losses coefficients are those the compositions of which correspond to the maximums of the bell-shaped permeability curves of Fig. 2.

In Fig. 2, I have shown six curves giving, for six different percentages of MnO before compression, the initial permeability as a function of the molecular percentage in Fe$_2$O$_3$ of the initial mixture of oxides, each of these curves corresponding to the same percentage in MnO.

These curves are bell-shaped curves having a very sharp maximum. For each of the percentages in MnO, it is thus possible to characterize a ferrite composition which corresponds to the maximum of permeability.

Figure 4:
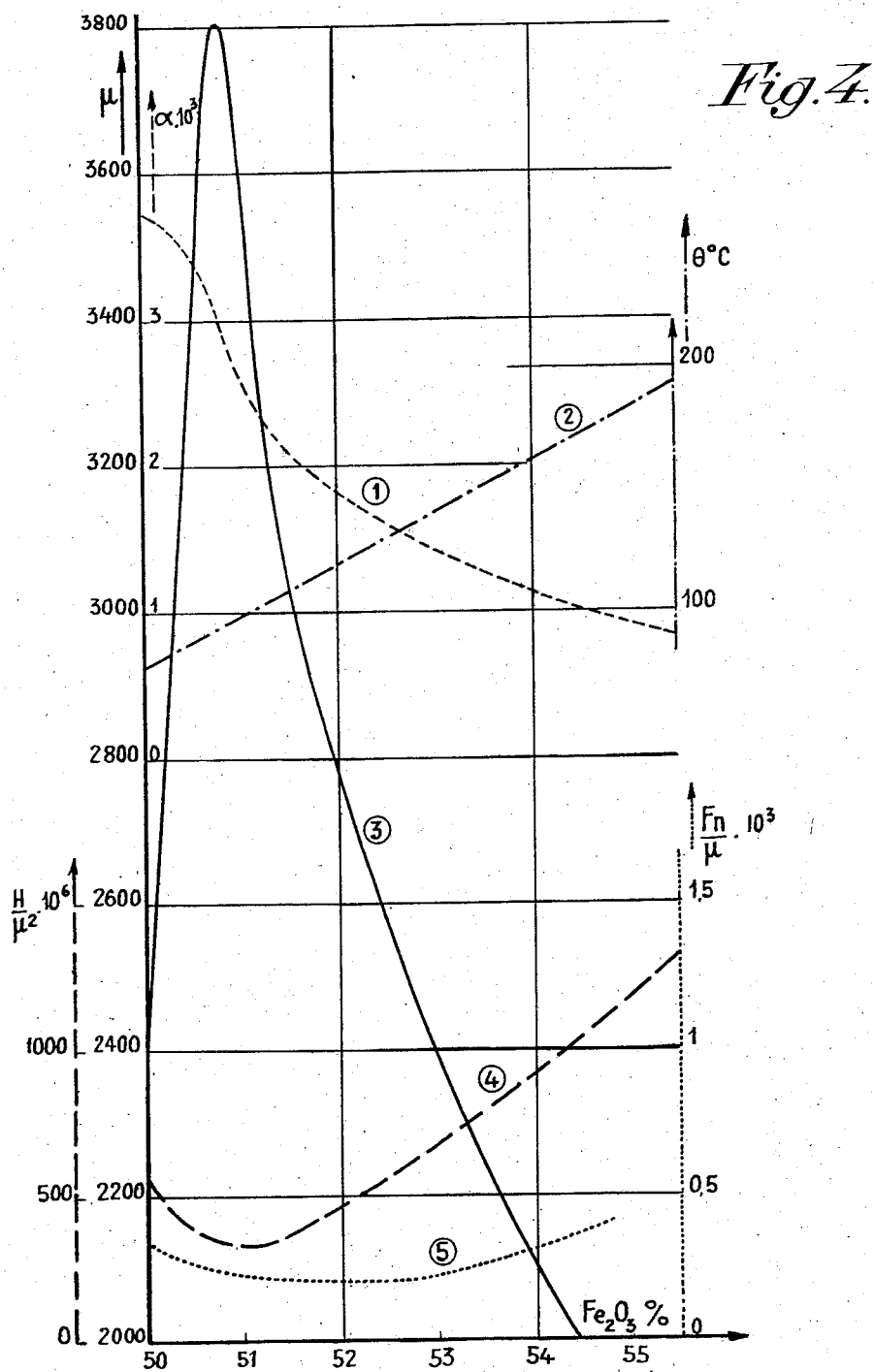
Fig. 4 shows the chief properties of ferrites containing 24% of MnO. Curves 1, 2, 3, 4, 5 of this figure respectively represent the values of the temperature coefficient $\alpha$ of the magnetic permeability multiplied by the numerical factor $10^3$, of the Curie points (Curie temperatures) $\theta°$ C., of the initial permeability $\mu$, of the quantity $$\frac{H}{\mu^2} \cdot 10^6$$

On the other hand, Table I and Fig. 4 indicate the properties of ferrites for which the molecular percentage in MnO of the mixture before compression is equal to 24.4 and for variable molecular percentages of Fe$_2$O$_3$ before compression. These ferrites are prepared from cores compressed for 4 hours at a temperature of 1250° C. in a nitrogen atmosphere containing 0.3% of oxygen.

The columns of this Table I relate respectively: to the molecular percentage before compression of Fe$_2$O$_3$, to the initial permeability ($\mu$), to the hysteresis losses coefficient ($H$), to the hysteresis losses coefficient referred to an initial permeability equal to $$1000\left(\frac{H}{\mu^2}\cdot 10^6\right)$$

to the Foucault current losses coefficient ($Fn$), to the Foucault current losses coefficient referred to an initial permeability equal to $$1.000\left(\frac{Fn}{\mu}\cdot 10^3\right)$$

to the maximum induction at 20° C. (B max.), to the Curie point ($\theta$° C.) and, finally, to the coefficient of relative variation as a function of the temperature of the initial permeability counted in thousandths ($\alpha.10^3$) of the ferrites thus formed.

TABLE I

| Fe$_2$O$_3$ percent | $\mu$ | H | $\frac{H}{\mu^2}.10^6$ | Fn | $\frac{Fn}{\mu}.10^3$ | B max. | $\theta$° C. | $\alpha.10^3$ |
|---|---|---|---|---|---|---|---|---|
| 50.6 | 3,600 | 4,820 | 370 | 0.93 | 0.26 | 3,260 | 90 | +3.3 |
| 50.8 | 3,800 | 4,760 | 330 | 0.87 | 0.23 | 3,360 | 94 | +3 |
| 51.6 | 2,970 | 3,500 | 400 | 0.67 | 0.225 | 3,690 | 110 | +2 |
| 52.6 | 2,530 | 3,900 | 610 | 0.52 | 0.21 | 4,050 | 134 | +1.5 |
| 53.6 | 2,200 | 3,820 | 790 | 0.62 | 0.28 | 4,335 | 156 | +1.2 |
| 54.6 | 1,970 | 4,330 | 1,120 | 0.76 | 0.39 | 4,500 | 178 | +1 |
| 55.6 | 1,850 | 4,400 | 1,280 | 0.80 | 0.43 | 4,600 | 198 | +0.8 |

It was found that, if the conditions differ from the optimum preparation conditions, that is to say from the preparation conditions which lead to the highest values of permeability, substantially identically shaped curves are obtained which are deduced from one another by a mere translation in the vertical direction. In Figs. 2 and 4, the composition corresponding to the maximum of permeability does not change. This is an important property which makes it possible, for every percentage in MnO, to determine a composition which is practically independent of the conditions of preparation and which corresponds to the maximum permeability.

The curves given by Figs. 2 and 4 illustrate the properties of good materials and the following Table II gives the compositions of the ferrites corresponding to the maximum of the bell-shaped curves of permeabilities of Fig. 2, and also to the initial mixtures making it possible to obtain such ferrites.

TABLE II

| MnO in percent before compressing | Fe$_2$O$_3$ in percent before grinding | Fe$_2$O$_3$ in percent after grinding | FeO in percent by weight of the formed ferrite | Molecular percentages of the formed ferrite | | | |
|---|---|---|---|---|---|---|---|
| | | | | Fe$_2$O$_3$, percent | FeO, percent | MnO, percent | ZnO, percent |
| 27 | 52.0 | 52.6 | 2.2 | 49.9 | 3.6 | 26.5 | 20.1 |
| 29 | 52.2 | 52.8 | 2.3 | 49.9 | 3.8 | 28.4 | 17.9 |
| 31 | 52.5 | 53.1 | 2.6 | 50.0 | 4.2 | 30.3 | 15.5 |
| 33 | 53.1 | 53.7 | 3.0 | 50.0 | 4.9 | 32.1 | 13.0 |
| 35 | 53.3 | 53.9 | 3.2 | 49.9 | 5.3 | 34.1 | 10.7 |
| 38 | 53.4 | 54.0 | 3.3 | 49.9 | 5.3 | 37.0 | 7.8 |

But if, as above stated, the positions of the maximums of the bell-shaped curves of Figs. 2 and 4 lead, for a given batch or lot of oxides, and consequently for oxides of the same origin, to percentages of Fe$_2$O$_3$ in the initial mixture of oxides which are practically well determined whatever be the conditions of preparation within the scope of the invention, these percentages in Fe$_2$O$_3$ may, on the contrary, vary slightly according to the origin of the oxides.

For instance, the results which are illustrated by the curves of Fig. 2 have been obtained by making use of the saline oxide of manganese resulting from a calcination of manganese carbonate. But if, instead of carbonate, I make use of manganese oxalate for the obtainment of the saline oxide Mn$_3$O$_4$, slight differences are found in the percentages in Fe$_2$O$_3$ of the initial mixture of oxides giving the maximum of permeability.

In order to take into account all the influences that may influence the position of this maximum, I have given in Fig. 10 a diagram which indicates, as a function of different molecular percentages in MnO before compression ranging from 24 to 38%, the limits within which the molecular percentages in Fe$_2$O$_3$ of the initial mixture of oxides before compression must be comprised. The cross hatched portion of the drawing therefore defines the zone within which the maximum of the bell-shaped curve is located and Table III gives the values of these limits as a function of the molecular percentage in MnO.

TABLE III

| MnO, Percent | Fe₂O₃, Percent | MnO, Percent | Fe₂O₃, Percent |
| --- | --- | --- | --- |
| 24 | 50.2-50.5 | 32 | 53.4-53.9 |
| 25 | 51.3-51.5 | 33 | 53.6-54.1 |
| 26 | 52.0-52.3 | 34 | 53.7-54.2 |
| 27 | 52.3-52.8 | 35 | 53.8-54.3 |
| 28 | 52.6-53.1 | 36 | 53.9-54.4 |
| 29 | 52.8-53.3 | 37 | 53.9-54.4 |
| 30 | 53.0-53.5 | 38 | 53.9-54.4 |
| 31 | 53.2-53.7 | | |

Practically, in order to obtain this maximum, by starting from the same batch of oxides, I first make a test by choosing, for a given percentage in MnO, a percentage in Fe₂O₃ which corresponds to a point of the cross hatched zone, then I make a new test by choosing a new point located on one side or the other of the first point and always located in the zone in question, while keeping of course the same percentage in MnO. I thus determined in what direction the percentage in Fe₂O₃ is to be modified in order to obtain this maximum. Some further tests are then sufficient to surround this maximum and to fix its position.

This diagram and Table III thus make it possible to determine the percentages of the components of the mixture of oxides which make it possible to obtain ferrites of a very high initial magnetic permeabiltiy, for instance one higher than 2.500 and the value of $$\frac{H}{\mu^2} \cdot 10^6$$

of which is lower than 600, that of $$\frac{Fn}{\mu} \cdot 10^3$$

being lower than 0.30 and that of $$\frac{t}{\mu} \cdot 10^3$$

lower than 10.

Finally, Table IV gives the values of the percentages in FeO by weight as a function of the molecular percentages in MnO of ferrites complying with the above indicated properties.

TABLE IV

| MnO, percent, molecular percentages | FeO, percent, percentages by weight | MnO, percent, molecular percentages | FeO, percent, percentages by weight |
| --- | --- | --- | --- |
| 24 | 0.3 | 32 | 2.8 |
| 25 | 1.1 | 33 | 3.0 |
| 26 | 1.7 | 34 | 3.1 |
| 27 | 2.1 | 35 | 3.2 |
| 28 | 2.2 | 36 | 3.2 |
| 29 | 2.3 | 37 | 3.2 |
| 30 | 2.5 | 38 | 3.3 |
| 31 | 2.6 | | |

In the table of Fig. 1 I have not indicated the values of the residual losses. As a rule, for ferrites according to the invention, the value of $t/\mu \cdot 10^3$ is lower than 12.

Independently of ferrites having initial magnetic permeabilities higher than 2.500, the method according to the invention makes it possible to obtain a large range of ferrites the initial magnetic permeability of which is higher than 2.000. These materals, owing to their high permeability, may have many useful applications.

In order to obtain ferrites having such permeabilities, it is necessary, the conditions concerning the nature of the oxides and the preparation being fulfilled, as it will be described, to have percentages in Fe₂O₃ of the mixture of oxides before compressing ranging within certain limits and this as a function of the molecular percentage in MnO. In the following Table V, I give for different molecular percentages in MnO before compression ranging from 24% to 38% the lower and upper limits of the corresponding percentages in Fe₂O₃. Interpolation makes it possible to know the limit values in Fe₂O₃ for a value of MnO which is not an integer when expressed in percent.

TABLE V

Molecular percentages before compression

| MnO, percent | Fe₂O₃, percent | MnO, percent | Fe₂O₃, percent |
| --- | --- | --- | --- |
| 24 | 50 -54 | 32 | 51.1-55 |
| 25 | 50 -54.5 | 33 | 51.8-55 |
| 26 | 50 -54.9 | 34 | 52.2-55 |
| 27 | 50 -55 | 35 | 52.4-55 |
| 28 | 50 -55 | 36 | 52.5-55 |
| 29 | 50.1-55 | 37 | 52.6-55 |
| 30 | 50.2-55 | 38 | 52.8-55 |
| 31 | 50.5-55 | | |

Within these limits, I will therefore obtain a permeability higher than 2.000 for any value in Fe₂O₃, but this permeability, higher than 2.000, will be the higher as account will be taken of the bell-shaped curves of Fig. 2 and of Fig. 4 which indicate how to choose the best molecular percentages in Fe₂O₃ of the initial mixture of oxides.

It is also possible graphically to determine these values by tracing the curves giving the limit values of the molecular percentages in Fe₂O₃ as a function of the molecular percentages in MnO (Fig. 11). These curves thus permit to know directly with a sufficient accuracy, for any value in MnO ranging from 24% to 38%, the percentages in Fe₂O₃ that are to be complied with in the mixture of oxides to obtain an initial permeability higher than 2.000. The percentages that are given are those before compression of the mixture of powders.

By suitably adapting the conditions of preparation which will be hereinafter described and if, in particular, the percentage of FeO in the ferrite that is formed is suitable, not only will the permeability that is obtained be higher than 2.000, but the losses coefficients may comply with the following conditions:

$$\frac{Fn}{\mu} \cdot 10^3 < 0.30 \text{ and } \frac{H}{\mu^2} \cdot 10^6 < 1.000$$

In the table of Fig. 1 are also indicated the given values of the admissible maximum induction (column J), which is the value of induction obtained in a magnetizing field of 500 oersteds and at a temperature of 20° C.

Fig. 5 (upper part) reproduces these results in the form of curves and gives, for every percentage in MnO before compression, the value of this induction as a function of the percentage in Fe₂O₃ before and after grinding. These curves permit interpolations and extrapolations as may be necessary to determine the composition of the mixture of oxides which permits of obtaining a ferrite the maximum admissible induction of which has a predetermined value.

On the other hand, the variations of this maximum induction for the ferrites that are obtained from the same composition of the mixture of oxides before compressing but with different thermal treatments are small and may be practically neglected.

Other data concerning induction are important; one of them for instance is the value $B_1$ of the induction corresponding to the upper limit of the rectilinear portion of the curve giving the induction as a function of the magnetizing field and, on the other hand, the thermal variation of the above defined maximum admissible induction.

Table VI gives these data.

TABLE VI

| MnO, percent before compressing | Fe²O³, percent | | Maximum admissible induction at 20° C. | Maximum admissible induction at 60° C. | B₁ |
|---|---|---|---|---|---|
| | before grinding | before compressing | | | |
| 27 | 52 | 52.6 | 4.340 | 4.150 | 2.800 |
| 29 | 52 | 52.6 | 4.830 | 4.440 | 3.000 |
| 31 | 52 | 52.6 | 4.980 | 4.600 | 3.150 |
| 33 | 52 | 52.6 | 5.070 | 4.700 | 3.200 |
| 35 | 52 | 52.6 | 5.160 | 4.800 | 3.650 |
| 38 | 52 | 52.6 | 5.240 | 4.880 | 3.900 |

For each of the different percentages in MnO there is given only one example, because the same thermal variations of the induction may be admitted for all the ferrites belonging to the same group.

The Curie points (or Curie temperatures) of the various kinds of ferrites according to the invention are indicated in the table of Fig. 1 (column K), in Table I and in Figs. 4 and 5. The Curie points are the higher as the percentage in MnO is higher and in a given group with a constant percentage in MnO the Curie points become higher as Fe₂O₃ percentages in the initial mixture increases.

The curves of Fig. 5 make it possible, by interpolation and extrapolation, to know the composition of the mixture of oxides which permits of obtaining a ferrite the Curie point of which has a predetermined value.

Inside a given group, the Curie points also vary as a function of the method of preparation. These variations may be as high as about 8° C. The numbers indicated in the tables correspond to the average values of the Curie points (conventionally, I designate by "Curie point" the temperature for which the ferro-magnetic properties disappear).

Among the ferrites which constitute the subject-matter of the present invention, I will more particularly describe those the Curie points of which are lower than 250° C. and the molecular percentages of which in MnO and ZnO are respectively lower than 35% and 15% or the molecular percentages of which in MnO and ZnO are respectively higher than 35% and lower than 15%.

The following Table VII gives the possibility of choosing the compositions of the initial mixtures of oxides before compressing which make it possible to prepare ferrites complying with the above conditions. As a matter of fact, in this table there are indicated, for various molecular percentages in MnO, the limits of the molecular percentages in Fe₂O₃ within which a choice is possible. By interpolation it is possible to know the limits for non-integer values of the percentages in MnO.

TABLE VII

*Molecular percentages before compressing*

| MnO, Percent | Fe₂O₃, Percent | Mno, Percent | Fe₂O₃, Percent |
|---|---|---|---|
| 29 | 56 | 34 | 51–55.7 |
| 30 | 55–56 | 35 | 50–55.4 |
| 31 | 54–56 | 36 | 50–55.0 |
| 32 | 53–56 | 37 | 50–54.6 |
| 33 | 52–56 | 38 | 50–54.1 |

In order to determine in this case the upper limits in Fe₂O₃, I have taken into account the variations of the Curie point as a function of the conditions of preparation and, furthermore, I have used a practical definition of the Curie point which is often used, to wit "a temperature at which the initial permeability is but 1/10 of the maximum initial permeability," so that Table VII is not quite in accordance with the table of Fig. 1.

The diagram of Fig. 6 completes the table and is still easier to use. It makes it possible directly to know the initial composition of a mixture of oxides before compressing which leads to a ferrite such that $\theta°$ C.$<250°$ and which complies with the first and with both of the following conditions ZnO$<15\%$, MnO$>35\%$.

This diagram is divided into several regions. The one which illustrates Table VII is cross hatched. Considering for instance a point A of the diagram in the cross hatched portion thereof, it is seen that this point corresponds to molecular percentages in MnO and Fe₂O₃ before compression which are respectively 33.5% and 53.5%.

Due to the fact that the ferrite that is formed contains FeO, the percentage in ZnO of the ferrite is not identical, as already is specified, to the percentage in ZnO of the mixture of oxides before thermal treatments. I may take into account this observation which does not modify the conclusions of the diagram but which may slightly move back the lower limit (the percentage in ZnO of the ferrite that is formed is in fact lower by about 0.4% than the percentage in ZnO of the mixture of oxides serving to the manufacture of this ferrite).

Account being taken of the other properties which are to be obtained: permeability, losses, temperature coefficient, induction, it is then possible to choose a composition which, owing to the methods of manufacture which are a part of my invention and will be hereinafter described, leads to a ferrite which also complies with the conditions: $\theta°$ C.$<250$, ZnO$<15\%$, MnO$>35\%$.

The coefficient of relative variation of the initial permeability as a function of the temperature will be defined by the formula $$\alpha = \frac{1}{\mu} \cdot \frac{\Delta\mu}{\Delta T}$$

In this formula, $\mu$ designates the initial permeability at 10° C., $\Delta\mu$ the variation of this permeability between 10° C. and 65° C, $\Delta T$ the temperature interval 10° C–65° C. ($\Delta T=55$). This coefficient is measured on a toroidal core without airgap.

It is very important, for several applications, to be able to prepare ferrites having temperature coefficients which are either positive, or negative or equal to zero and generally of any suitable value. It was found that the value and the sign of $\alpha$ depend chiefly upon the percentage in FeO of the ferrite that is formed (this percentage in FeO being defined according to the above described method). The percentages in FeO will be hereinafter given by weight, this value which may be obtained directly from the results of chemical analysis, being independent of any hypothesis.

In order to indicate the value of $\alpha$, I consider, according to the method already used, different groups of ferrites, each of these groups being characterized by a constant percentage of MnO before compressing. The table of Fig. 1 gives the values of $\alpha$ (column L) as a function of the percentage in FeO (column I) of the ferrite that is formed and of the percentage in Fe₂O₃ of the initial mixture of oxides.

The six curves of Fig. 7 show the values of $\alpha$ as a function of the molecular percentage in Fe₂O₃ before and after grinding. Each of these curves relates to ferrites containing the same molecular percentage in MnO (which besides is stated in Fig. 7). It is found that the zero coefficients correspond to the proportions given in the following Table VIII for the composition of the material.

TABLE VIII

| Molecular percentages before compressing | | FeO in Percent by weight of the formed ferrite | Molecular percentages of the formed ferrite | | | |
|---|---|---|---|---|---|---|
| MnO, Percent | $Fe_2O_3$, Percent | | $Fe_2O_3$, Percent | FeO, Percent | MnO, Percent | ZnO, Percent |
| 29 | 53.6 | 2.9 | 49.9 | 4.7 | 28.4 | 17.0 |
| 31 | 53.8 | 3.1 | 49.9 | 5.1 | 30.2 | 14.8 |
| 33 | 54.0 | 3.2 | 50.0 | 5.2 | 32.1 | 12.7 |
| 35 | 54.2 | 3.4 | 49.9 | 5.5 | 34.0 | 10.6 |
| 38 | 54.6 | 3.7 | 50.1 | 5.9 | 36.8 | 7.2 |

The coefficients $\alpha$ which are given in this table are average coefficients; they are constant between 10° C. and 65° C. only if the variation of the permeability as a function of the temperature is linear. Fig. 8, which relates to the group containing 31% of MnO, shows that this is not always the case (in order to permit an easier comparison, the initial permeabilities at 10° C. have been arbitrarily referred to 1.000).

If the curves giving $\mu$ are traced as a function of T, as shown by Fig. 9, from —200° C. up to the Curie points of the various ferrites the compositions of which are indicated in this figure, it is found that, for the ferrites rich in FeO, these curves have two maximums. One of these maximums is very close to the Curie point, the other is at a temperature rather close to 0° C.

This property makes is possible to explain, in particular, the existence of zero and negative values of $\alpha$.

On the other hand, each of the groups characterized by a given molecular percentage in MnO before compressing does not correspond to a single curve representing $\alpha$ as a function of the initial percentage of $Fe_2O_3$. The conditions of preparation: temperature and time of heating, atmosphere, etc., slightly modify the values of $\alpha$ as a function of this percentage.

It is pointed out that, in particular, the curves of Fig. 7 give temperature coefficients equal to zero for percentages in $Fe_2O_3$ of the initial mixture of oxides which are the lowest of those that can be chosen. As a rule, if a modification of the percentage in $Fe_2O_3$ is necessary in order to obtain such a coefficient, this modification will generally be made by increasing the percentage in $Fe_2O_3$ as indicated in the table of Fig. 1 and in Fig. 7.

Research of the desired percentage in $Fe_2O_3$ can be made systematic by applying the following rule which results from a study of the table of Fig. 1 or of Fig. 7 and which indicates in what direction varies the coefficient of temperature as a function of the molecular percentage in $Fe_2O_3$ of the initial mixture of oxides. Thus, if the temperature coefficient is positive, it decreases if the percentage in $Fe_2O_3$ increases; if, on the contrary, the temperature coefficient is negative, it is necessary to reduce the amount of $Fe_2O_3$ in order to increase the temperature coefficient in obsolute value.

All these considerations are of course valid only if on the other hand the conditions of preparation remain the same.

It is also specified that it is not always a temperature coefficient equal to zero that is desired but that, account being taken of the conditions of utilization of the ferrites, this coefficient may be desired to have, on the contrary, a predetermined positive or negative value ranging from $+12.10^{-3}$ to $-3.4.10^{-3}$ per centigrade degree.

To sum up, when it is desired to obtain a positive coefficient, the initial mixtures of oxides must have molecular percentages in MnO ranging from 24% to 27% and, when it is desired to obtain either positive or negative values of the coefficient, said molecular percentages must range from 27% to 38%.

The above considerations also apply in this case and research of a composition making it possible to obtain a temperature coefficient of predetermined value is carried out in the same way as research for a temperature coefficient equal to zero.

A survey bearing on several hundreds of samples showed that it is for a molecular percentage of $Fe_2O_3$ before thermal treatment equal to 54.3% that a temperature coefficient equal to zero is most frequently obtained. In order to determine the percentage before grinding, I may possibly reduce the above indicated value by an amount corresponding to the quantity of iron added by the grinding mill.

In order to obtain such a temperature coefficient or a coefficient of very low value, I will therefore choose this composition and, as a function of the results that are obtained, I will slightly modify if necessary the percentage in $Fe_2O_3$ in accordance with the above stated rules.

Method of manufacture (1) COMPOSITION AND NATURE OF THE OXIDES USED IN THE INITIAL MIXTURE I make use of the following oxides to make the initial mixture: iron sesquioxide $Fe_2O_3$, saline oxide of manganese $Mn_3O_4$ and zinc oxide ZnO.

Homogeneity of the mixture of oxides before compression and suitable fineness of the grains are obtained by passage through a ball mill, preferably of steel.

I make use of other manganese oxides, but in order to obtain results which can be perfectly reproduced, it was found that it is necessary to use by preference the saline oxide $Mn_3O_4$.

It was also found that, in order to obtain high values of the permeability and low losses, the oxides must comply with well determined conditions concerning purity. But the various impurities that may exist in the mixtures are not equivalent, both concerning their action on permeability and that on losses. In order to make sure of their specific influence, I prepared a series of ground mixtures by starting from oxides which were spectroscopically pure and in each of them I introduced a well determined impurity corresponding to 0.2% of the total weight of the oxides.

Table IX gives results which bring into light considerable differences as to the influence of the different impurities on permeability and losses.

TABLE IX

| Impurities | Permeability | $\frac{H}{\mu^2}.10^6$ | $\frac{Fn}{\mu}.10^3$ |
|---|---|---|---|
| reference piece | 2.520 | 300 | 0.16 |
| arsenic | 2.100 | 1.400 | 0.73 |
| aluminium | 2.000 | 440 | 0.95 |
| boron | 1.950 | 1.230 | 3.70 |
| cesium | 1.900 | 545 | 0.32 |
| titanium | 1.650 | 890 | 1.50 |
| lead | 1.650 | 2.150 | 0.70 |
| cobalt | 1.600 | 800 | 0.29 |
| strontium | 1.500 | 1.550 | 2.75 |
| potassium | 1.400 | 580 | 0.35 |
| silicon | 1.250 | 1.440 | 0.62 |
| chromium | 1.000 | 10.000 | 3.30 |
| lithium | 800 | 700 | 0.42 |
| sodium | 750 | 1.890 | 0.57 |
| barium | 500 | 2.990 | 1.30 |

Practical conclusions are as follows:

In order to obtain the desired properties, the oxides that are used must contain only traces of the following impurities: barium, sodium, lithium, chromium, silicon, potassium, strontium, cobalt, lead, boron, titanium.

By "traces," I mean amounts such that they can be brought into evidence only at the limit of accuracy of chemical analysis (about 0.01% by weight).

For the other impurities the action of which is not so detrimental, I may admit a percentage by weight averaging 0.05%.

According to the invention, it was found that iron oxides and manganese oxides having substantially a composition corresponding to $Mn_3O_4$, which are particularly well adapted to the above described methods of preparation, were obtained on the one hand by calcining ferrous oxalate at 500° C. approximately for the time necessary to transformation of the oxalate into an oxide, and on the other hand by calcining manganese carbonate at 1000° C. or manganese oxalate at 900° C. for about two hours, these manganese oxides being particularly well adapted for ferrites the molecular percentage in such oxides of which ranges from 24% to 35%.

The materials the properties of which have been above described have been prepared from oxides obtained in this manner.

By calcining manganese carbonate at 600° C. in suitable conditions, I obtain a manganese oxide of substantially $Mn_3O_4$ composition which makes it possible to obtain a high initial magnetic permeability, in particular for materials having a high molecular percentage in MnO, ranging for instance from 35 to 38%.

Finally, the oxides must be intimately mixed together so as to form a very homogeneous mixture and, furthermore, it was found that, in order to obtain the best possible properties, the highest dimension of the grains must average 0.5 thousandths of a millimeter. This last condition involves a duration of grinding which depends upon the characteristics of the mill that is used. As a rule, a grinding of about twenty hours is satisfactory.

(2) GRINDING

The mixture of oxides is prepared in a ball mill. In accordance with the above considerations, this mill must not introduce detrimental impurities. In order to comply with this condition, the best solution consists in making use of a steel mill. But this mill incorporates into the mixture of oxides a supplementary amount of iron which must be taken into account.

On the other hand, the time of grinding is determined by the obtainment of grains the highest dimension of which has already been indicated.

In order to make the grinding operation systematic, it is advisable to introduce into the mill always the same amount of powder and balls and to run the mill always for the same time.

In order to make it possible easily to reproduce the results according to my invention and to avoid any testing, the essential characteristics of a grinding mill as was used are hereinafter indicated.

Hardness: 180 Brinell—volume: 2 litres—total weight of the steel balls: 1.5 kg.—balls of a diameter ranging from 5 to 15 mm.—rotation speed: 180 r./m.—mass of the oxides: 250 grams—time of operation: 20 hours. The mill introduces into the mixture an amount of iron such that it corresponds to an increase of 0.6% for the molecular percentage of $Fe_2O_3$. This amount depends upon the mill that is used; it must be determined for every mill before taking it into account. The balls that are used are of the quality commonly used in ball bearings.

(3) COMPRESSION

The compression method is important beacuse it is the pressure under which it is conducted which determines the density of the ferrite that is formed.

It was found that in order to obtain the best possible values of permeability and losses the apparent density of the material that is obtained must not be lower than 0.9 of the theoretical density, determined for instance by X-ray examination.

Below this density, the permeability decreases and the losses increase the more so as the density is lower. In order to obtain the best possible properties, it is necessary to carry out the compression at pressures which must range as a rule from 3 to 10 tons per sq. cm.

In order to obtain by compression cores of more or less complicated shapes, it is often necessary to add to the powders a binder which is preferably an organic one; this binder must be chemically neutral with respect to the oxides and at any temperature and it is advantageous to eliminate it at low temperature before subjecting the materials to the final thermal treatments.

Urea and camphor give satisfactory results, but of course other products may be used for this purpose.

(4) THERMAL TREATMENT

The compressed materials to be treated are placed on the hearth of a furnace for their thermal treatment.

This furnace must comply with the following requirements according to my invention:

(a) It must be fluidtight so that its atmosphere can be exactly controlled;

(b) It may have, if it is an electric furnace, heating windings which do not oxidize during the treatment if these windings are in contact with the atmosphere of the furnace and which can produce, in the portion of the furnace where the ferrites are placed, a temperature as high as 1.300° C.;

(c) The refractory elements must be such that they permit a very quick gaseous interchange, which leads in fact to having at any time a homogeneous atmosphere in the whole of the furnace. Furthermore, these refractory materials must contain but the minimum possible amount of adsorbed or occluded gases, as these gases may perturb, during the operation, the atmosphere of the furnace; alumina refractory elements comply with these conditions;

(d) In all the portion of the furnace that is used for the preparation according to my invention, the temperature must be uniform with a variation of ±5° C.;

(e) The temperature regulation system must be such that the temperature can be adjusted to a given value with an accuracy of ±5° C.;

(f) It must be possible to vary the temperature as a function of time as it is desired.

After a rise of the temperature within a time which is not critical, the constant high temperature ranges from 1.170° to 1.280° C., for a time which generally ranges from two to four hours.

All other things being equal, permeability is the higher as this constant temperature is higher. But there is a limit imposed by crystallization phenomena. Practically, the upper limit temperature must remain below that for which crystals clearly visible to the bare eye are observed on the surface of the ferrite.

This upper temperature limit is not constant and depends in particular upon the way in which the oxides that are used have been prepared, but it is close to 1.280° C. Cooling down to substantially atmospheric temperature must take place in at least ten hours and preferably about fifteen hours.

The following Table X gives the values of the initial magnetic permeabilities obtained for different temperatures of the constant heating treatment of a ferrite containing 27% of MnO and 53% of $Fe_2O_3$ before compression. The general behaviour of the phenomenons is the same for all ferrites according to the invention.

TABLE X

| Temperature and duration of heating at constant temperature | Initial magnetic permeability that is obtained |
| --- | --- |
| 4 hours at 1.170° | 1.500 |
| 4 hours at 1.200° | 2.820 |
| 4 hours at 1.220° | 3.380 |
| 4 hours at 1.250° | 3.650 |

This table shows a high sensitivity of permeability to the choice of the temperature.

(5) ATMOSPHERE OF THE FURNACE

The nature of the atmosphere of the furnace plays a very important part in the efficiency of the thermal treatment.

As a matter of fact, it is this atmosphere which determines the final percentages in FeO and consequently, as already stated, the permeability, the losses and the temperature coefficient depend to a high degree thereon.

In all cases, it is necessary to obtain a ferrite the molecular percentage of which is equal or close to 50%, the supplement of iron being in the form of FeO; Fig. 5 indicates for every molecular percentage in $Fe_2O_3$ of the mixture before thermal treatment and before grinding, the limits of variation of the percentage in FeO by weight of the ferrite which may be admitted in order to have molecular percentages of $Fe_2O_3$ in the ferrite that is finally formed ranging from 49.7% to 50.6% (cross hatched zone ABCD) or still better from 49.7% to 50.3% (portion of said zone that is limited by lines AB, BE, EF and FA). The upper limit 50.6 enters into account chiefly for high percentages in FeO.

In order to obtain such a result, it is necessary to treat the ferrites in an atmosphere consisting of a substantially inert gas. I preferably make use of nitrogen gas but I might use any other gas which does not react with oxides, for instance argon. However, this substantially inert gas must contain a small percentage of oxygen.

It is the value of this small percentage of oxygen which determines partly the amount of FeO that is finally obtained.

It was found that, while during the treatment up to a time about a quarter of an hour before the end of the constant temperature period, that is to say about a quarter of an hour before cooling is started, the amount of oxygen is not very critical but that after this time it becomes so. During the end of the thermal treatment at high temperature and during the cooling period, the percentage of oxygen must then be well adapted.

This percentage in oxygen is variable. Practically, it cannot be indicated in accurate fashion, but merely by approximately indicating the extreme limits thereof, because the optimum value which permits of obtaining the best possible properties depends, among other things, upon the origin and the method of chemical and thermal preparation of the oxides from which the products are obtained. These limits are about 0.01% and 1.2% by volume. For a given batch or lot of oxides, characterized by the methods of preparation that have been used for obtaining them, the percentage of oxygen in the nitrogen atmosphere of the furnace that is the best adapted for the desired purposes must be determined experimentally.

In order to obtain this atmosphere, different methods can be used. The furnace may be fed with a current of nitrogen gas having a fixed percentage in oxygen during the whole thermal treatment including cooling to atmospheric temperature. I may also make use of a circulation of nitrogen gas containing a given proportion of oxygen up to a time about fifteen minutes before the cooling period and I then circulate nitrogen containing another fixed percentage of oxygen for the remainder of the thermal treatment (end of the constant temperature period and cooling period).

The atmosphere of the furnace is kept for all the time during which nitrogen is circulated at a pressure slightly above atmospheric pressure.

I may also, after having achieved a circulation of nitrogen containing a fixed amount of oxygen, carry out the end of the thermal treatment by suppressing the circulation of nitrogen gas in the furnace.

In order to adjust the proportion of oxygen in the nitrogen atmosphere, it is advisable first to carry out a trial with an average percentage and after a first result has been obtained, which is generally characterized in that the proportion of FeO in the final product is different from the desired one, the proportion of oxygen of the nitrogen atmosphere will be decreased or increased according as the result of this first trial has shown a lack or an excess of FeO, which are indicated in particular by the initial magnetic permeability that is obtained. This rule makes it possible to adjust the proportion of oxygen to be maintained in the atmosphere of the furnace by as little trial and error as possible, the other conditions of thermal treatment remaining the same.

All the ferrites that are indicated in the following Table XI have been prepared from mixtures containing the same molecular percentage in MnO (27%).

TABLE XI

| percentage MnO before compression, percent | percentage $Fe_2O_3$ before compression, percent | thermal treatments, temperature and times | percentage in volume $O_2$, percent | initial permeability | H | Fn |
|---|---|---|---|---|---|---|
| 27 | 53.6 | 2½ hours at 1220° | 0.04 | 2.800 | 2.900 | 2.35 |
|  | 53.6 | d ° | 0.04 | 2.925 | 2.140 | 0.79 |
|  | 53.6 | d ° | 0.80 | 2.950 | 1.820 | 0.56 |
|  | 53.6 | d ° | 1.20 | 2.490 | 1.510 | 0.56 |

It is thus found that there is a value of the percentage of oxygen which leads to the best values of permeability and losses.

In order to make it possible easily to reproduce the results that have been obtained, I will indicate the characteristics of a furnace that I used for experiment.

The furnace includes a refractory tube 1 (Fig. 12) having an internal diameter of 50 mm. and a length of approximately 65 mm. It is surrounded by heating windings 2 fed with current from a source 3 the voltage of which is adjusted by suitable means 4. Inside of the furnace are disposed two thermo-electrical couples 5 and 6 intended respectively to regulate the temperature of the furnace and to record it.

The furnace is in communication on the one hand with a reservoir 7, of a volume of about 5 litres, to which is connected a bottle 8 containing nitrogen under pressure with a small amount of oxygen therein and, on the other hand, with a vessel 9 containing mercury and which acts as a valve. In the furnace are placed the compressed cores 11. Before thermal treatment, the furnace 1 and the reservoir 7 are insulated by means of valves 12 and 13 and a vacuum is made therein by means of pump 14, valve 15 being opened. Then this valve 15 is closed and a nitrogen stream is caused to pass through the furnace by opening valves 12 and 13. The temperature variation is obtained through means 4, account being taken of the indications of the thermo-couple 5.

The amount of oxygen in the nitrogen atmosphere may be determined by known apparatus. A method applicable for this purpose was indicated, for instance, by L. Bary at the fifteenth Convention of Industrial Chemistry of Brussels, September 22–28, 1935. This method which was described as "method for continuously measuring the proportions of oxygen ... by means of traces in gases" was published in particular by "Chimie et Industrie," 28 Rue St. Dominique, Paris.

Some examples of use of this material, which must not be considered as having a limitative character, are hereinafter given.

*Examples of application*

EXAMPLE 1

A ferrite according to the present invention is well adapted for making low, mean and high frequency transformers and advantageously replaces thin ferro-nickel sheets for instance. The high and practically constant permeability up to about 1 megahertz increases the width of the band that is transmitted; the losses, which are negligible as compared with those of metal sheets, reduce the effective weakening.

For a mixture consisting of: 51.8% of $Fe_2O_3$, 27.3% of MnO, 20.9% of ZnO, ground for twenty-four hours, the compressed products being heated for four hours at 1.250° C., the circulation of nitrogen gas containing 0.3% of oxygen was stopped at the beginning of the cooling period. The following results were obtained:

$$\mu = 3.650$$
$$Fn/\mu.10^3 = 0.26$$
$$H/\mu^2.10^6 = 200$$
$$\theta° C. = 180° C.$$
$$B\ max. = 4.500\ gauss$$

This material makes it possible to obtain transformers capable of working from frequencies of some kilohertz up to frequencies of 20 megahertz. This material also permits of obtaining superposed direct current field transformers (amplifiers output transformers) having very good characteristics.

EXAMPLE 2

This example relates to a core for a magnetic deflection oscilloscope sweeping transformer or for a pulse or medium power high frequency transformer. Such transformers require a material having a high enough maximum permissible induction while varying little as a function of the temperature.

For a mixture comprising 52.2% $Fe_2O_3$, 38% MnO, 9.8% ZnO ground for twenty-four hours, the products heated for four hours at 1.250° C. in nitrogen containing about 0.4% oxygen give the following results:

$$\mu = 2.340$$
$$Fn/\mu.10^3 = 0.17$$
$$H/\mu^2.10^6 = 540$$
$$\theta° C. = 249° C.$$
$$B\ max. = 5.300\ gauss$$

High frequency power transformers using this material have an efficiency much higher than those making use of the usual magnetic laminations.

EXAMPLE 3

This example relates to a core for a low and medium frequency inductance coil of high quality.

For such coils, the material must combine the following properties: a sufficient permeability, very low Foucault current losses, very low hysteresis losses and residual losses, and it must be used with an airgap.

One of the essential points, as already stated, is the adjustment at will of the coefficient of variation of permeability as a function of temperature.

For an initial mixture comprising 53.7% $Fe_2O_3$, 32% MnO and 14.3% ZnO, ground for twenty-four hours, the products, heated for three hours at 1.250° C. in nitrogen containing 0.2% of oxygen (this proportion of oxygen in the nitrogen atmosphere is, as above indicated, to be determined experimentally) have a temperature coefficient which is practically zero from 10° to 65° C., and even from 0° to 70° C.

The characteristics of the material thus obtained are as follows:

$$\mu = 2.050$$
$$Fn/\mu.10^3 = 0.16$$
$$H/\mu^2.10^6 = 280$$
$$\theta° C. = 230° C.$$
$$\alpha \approx 0$$

What I claim is:

1. A method of manufacturing magnetic cores of a ferrite material having a high permeability and low losses at high frequency which comprises forming an initial homogeneous mixture of fine powders of pure iron sesquioxide, manganese oxide, and zinc oxide, the respective molecular percentages in this mixture ranging respectively from 50 to 55.6% for the iron sesquioxide, and from 24 to 39% for the manganese oxide, the latter value being defined with respect to the number of atoms of manganese, the remainder consisting of zinc oxide, said mixture of oxides containing at most 0.05% by weight of each of the two metals constituted by barium and strontium, compressing said mass under a pressure ranging from 3 to 10 tons per sq. cm. to give it the desired core form, subjecting the compressed mass to a thermal treatment which comprises heating it from 2 to 4 hours at a temperature ranging from 1170° to 1280° C. in an atmosphere essentially constituted by a chemically inert gas, but containing a small amount of oxygen, adjusting the percentage of oxygen in said atmosphere at least during the last fifteen minutes of the thermal treatment and during cooling from 0.01 to 1.2 in volume, this atmosphere being chosen in such manner and the heating and cooling operations being so conducted as to obtain a final product in which a portion of the iron sesquioxide initially present in the mixture has been changed into FeO, this portion ranging from 0.2 to 4.7 percent by weight.

2. A method according to claim 1 in which the molecular percentage of iron sesquioxide in the initial mixture ranges from 53.6 to 55, whereby it is possible to obtain a ferrite material having a coefficient of temperature of the initial permeability practically equal to 0 between 10 and 65° C.

3. A method according to claim 1 in which the iron sesquioxide contained in the initial mixture is prepared by calcining ferrous oxalate at a temperature close to 500° C.

4. The method of manufacturing a ferromagnetic material comprising mixing oxides of iron, manganese and zinc, compressing said mixture into a desired form, and heat treating said compressed form for 2–4 hours at a temperature between 1170°–1280° C. in a protective atmosphere having an oxygen content during the last 15 minutes of the heat treatment between 0.01 and 1.2% by volume, the molecular percentage of $Fe_2O_3$ in the starting mixture being such that the final product comprises 0.3–7.5 FeO, 49.7–50.6 $Fe_2O_3$, 24–38 MnO mol percentage and the remainder ZnO.

5. The method of manufacturing a ferromagnetic material comprising mixing pulverulent oxides of iron, manganese and zinc to obtain a substantially uniform mixture, compressing said mixture into a desired form and heat treating said compressed form for 2–4 hours at a temperature between 1170°–1280° C. in a protective atmosphere having an oxygen content between 0.01 and 1.2% by volume during the last 15 minutes of the heat treatment, the molecular percentage of $Fe_2O_3$ in the starting mixture being such that the final product comprises in molecular proportions 49.7–50.6 $Fe_2O_3$, 0.3–7.5 FeO, 24–38 MnO mol percentage and the remainder substantially ZnO.

6. Method according to claim 4 in which the $Fe_2O_3$ contained in the starting mixture is obtained by roasting ferrous oxalate, characterized in this, that the roasting of the ferrous oxalate is carried out at a temperature of about 500° C.

7. A ferromagnetic ceramic material constituted essentially by a crystalline structure containing iron sesquioxide $Fe_2O_3$, iron protoxide FeO, manganese protoxide MnO and zinc oxide ZnO, the respective molecular percentages of which range from 49.7 to 50.6 for $Fe_2O_3$, from 0.3 to 7.5 (i.e. from 0.2 to 4.7 by weight) for FeO, from 24 to 38 for MnO, the remainder consisting of ZnO, this material having an initial permeability higher than 2000, an eddy current losses coefficient $$\frac{F}{\mu}.10^3$$

lower than 0.5 and a hysteretic losses coefficient $$\frac{H}{\mu^2}.10^6$$

lower than 2000.

8. A ferromagnetic ceramic material constituted essentially by a crystalline structure containing iron sesquioxide $Fe_2O_3$, iron protoxide FeO, manganese protoxide MnO and zinc oxide ZnO, the respective molecular percentages of which range from 49.7 to 50.6 for $Fe_2O_3$, from 0.3 to 7.5 (i.e. from 0.2 to 4.7 by weight) for FeO, from 24 to 38 for MnO, the remainder consisting of ZnO, in which structure the dimensions of the grains range from 5 to 20 microns, this material having an initial permeability higher than 2000, an eddy current losses coefficient $$\frac{F}{\mu} \cdot 10^3$$

lower than 0.5 and a hysteretic losses coefficient $$\frac{H}{\mu^2} \cdot 10^6$$

lower than 1000.

9. A ferromagnetic ceramic material according to claim 7 in which the percentage by weight of iron protoxide FeO ranges from 0.3 to 3.3, said material having an initial permeability higher than 2500, a hysteretic losses coefficient $$\frac{H}{\mu^2} \cdot 10^6$$

lower than 1000 and an eddy current losses coefficient $$\frac{F}{\mu} \cdot 10^3$$

lower than 0.5.

10. A ferromagnetic ceramic material according to claim 7 in which the percentage by weight of iron protoxide ranges from 3 to 4, the temperature coefficient of the initial magnetic permeability being practically equal to 0 from 10 to 65° C.

11. A ferromagnetic material substantially consisting of a crystalline structure containing in molecular proportions 49.7 to 50.6% $Fe_2O_3$, 24 to 38% MnO, 0.3 to 7.5% FeO, the remainder consisting essentially of ZnO, and having an initial permeability higher than 2000, a hysteresis loss factor $$\frac{H}{\mu^2} \cdot 10^6$$

lower than 2000 and an eddy current loss factor $$\frac{F}{\mu} \cdot 10^3$$

less than 0.50.

12. The ferromagnetic material according to claim 11 wherein the grain dimensions of said crystalline structure are comprised between 5 and 20 microns.

13. A ferromagnetic material according to claim 11, characterized in this, that the molecular content of FeO is between 2.8 and 4.8%, the molecular content of MnO is between 26 and 33%, and having an initial permeability higher than 2500, a factor of hysteresis losses $$\frac{H}{\mu^2} \cdot 10^6$$

lower than 1000 and a factor of eddy current losses $$\frac{F}{\mu} \cdot 10^3$$

lower than 0.50.

14. Ferromagnetic material according to claim 11, characterized in this, that it contains in molecular percentages 4.7 to 6.4% FeO, the coefficient of the initial magnetic permeability being approximately equal to zero between 10 and 65° C.

References Cited in the file of this patent
UNITED STATES PATENTS 2,636,860    Snoek et al. _____ Apr. 28, 1953